Sept. 26, 1939.   M. HOUCK   2,174,106
INSTRUMENT FOR COMPUTING DATA AND CORRECTIONS IN GUNFIRE
Filed April 4, 1938   4 Sheets-Sheet 1

Inventor
Martin Houck
By Williamson & Williamson
Attorneys

Sept. 26, 1939.  M. HOUCK  2,174,106
INSTRUMENT FOR COMPUTING DATA AND CORRECTIONS IN GUNFIRE
Filed April 4, 1938  4 Sheets-Sheet 3

Inventor
Martin Houck
By Williamson & Williamson
Attorneys

Sept. 26, 1939.                M. HOUCK                      2,174,106
           INSTRUMENT FOR COMPUTING DATA AND CORRECTIONS IN GUNFIRE
                      Filed April 4, 1938         4 Sheets-Sheet 4

Inventor
Martin Houck
By Williamson & Williamson
Attorneys

Patented Sept. 26, 1939

2,174,106

UNITED STATES PATENT OFFICE

2,174,106

INSTRUMENT FOR COMPUTING DATA AND CORRECTIONS IN GUNFIRE

Martin Houck, Minneapolis, Minn., assignor of one-half to Delbert L. Rand, Minneapolis, Minn.

Application April 4, 1938, Serial No. 199,961

10 Claims. (Cl. 33—98)

This invention relates to an instrument for scientifically and accurately computing the basic data necessary for directing and controlling heavy gun fire.

My instrument is particularly adapted for use in heavy gun fire where the target cannot be seen from the position of the gun and where the adjustment of the gun must be directed and controlled from an observation point removed from the gun.

The present methods utilized by the United States and other nations for computing data and corrections necessary for directing and controlling artillery fire require many mathematical calculations, as well as the reference to numerous tables, and in making such calculations and corrections factors such as lateral observation, obliquity, windage, drift and calculation of the basic relations between the plotted observation point and gun position and target must all be taken into consideration. Because of the numerous calculations necessary and the corrections for the various enumerated factors, many very expensive shells are wasted before the gun is properly adjusted to shoot upon the target. After originally plotting out the basic relationship between the lateral observation point, the gun position and the target, and calculating the basic data and after firing successive shells, corrections of the moment must be made by the battery commander and these are necessarily far from accurate, with the result that in many cases from twenty to thirty shells are fired to obtain a correct adjustment of the gun.

It is an object of my invention to provide a scientific and highly efficient instrument which may be quickly set up for a given problem and which will eliminate the many mathematical calculations and use of tables to obtain the approximate elevation, range and deflection of the gun, and which apparatus after the first shell is fired will give the corrected readings necessary in elevation and deflection to accurately adjust the gun to fire very close to, if not directly upon, the base point of the target. In the use of my instrument after originally setting up the apparatus and firing the first shell, a finder is positioned on the instrument at the approximate point with reference to the target area of the instrument where the first shell struck, and a reading may be immediately taken off of the instrument for correction in elevation and also for correction in deflection without requiring calculations for drift, shift, windage or atmospheric conditions.

More specifically it is an object of my invention to provide an instrument or apparatus having certain elements which can be quickly set up to correspond to the actual relative positions between the observation point, target and gun position and by which the elevation and approximate range for the gun may be read from the instrument without calculation, taking into consideration selective scales conforming to the various ammunitions and types of guns which may be used.

A further object is the provision in an instrument of the class described of a finder mechanism so related with the elements set up for the particular problem that upon the shooting of the first shell and a sensing or report as to where that shell struck, the finder element may be positioned to a corresponding spot on the target area of my instrument, and the instrument will then automatically give corrected readings for both elevation and deflection to adjust the gun very accurately for the next shot. Successive shots may be likewise spotted by the finder and the corrected readings immediately taken until a direct "hit" is obtained. Due to the accuracy of my apparatus, a correct adjustment on the target may be usually obtained after firing from three to six shells.

My instrument is equally advantageous in very quickly enabling the gun to be directed and controlled for a transfer of fire to a new target, in which instance the finder element is first positioned on the spot of the target area of the instrument corresponding to the position of the new target. The corrected reading is obtained for this new position and the positioned elements of the apparatus are then reset for the new problem; the reading for the new elevation is taken; a shell is fired, and the finder is then utilized for corrections as in the case first described.

These and other objects and advantages of the invention will be more fully set forth in the following description made in connection with the accompanying drawings, in which like reference characters refer to the same or similar parts throughout the several views, and in which:—

Figure 3:
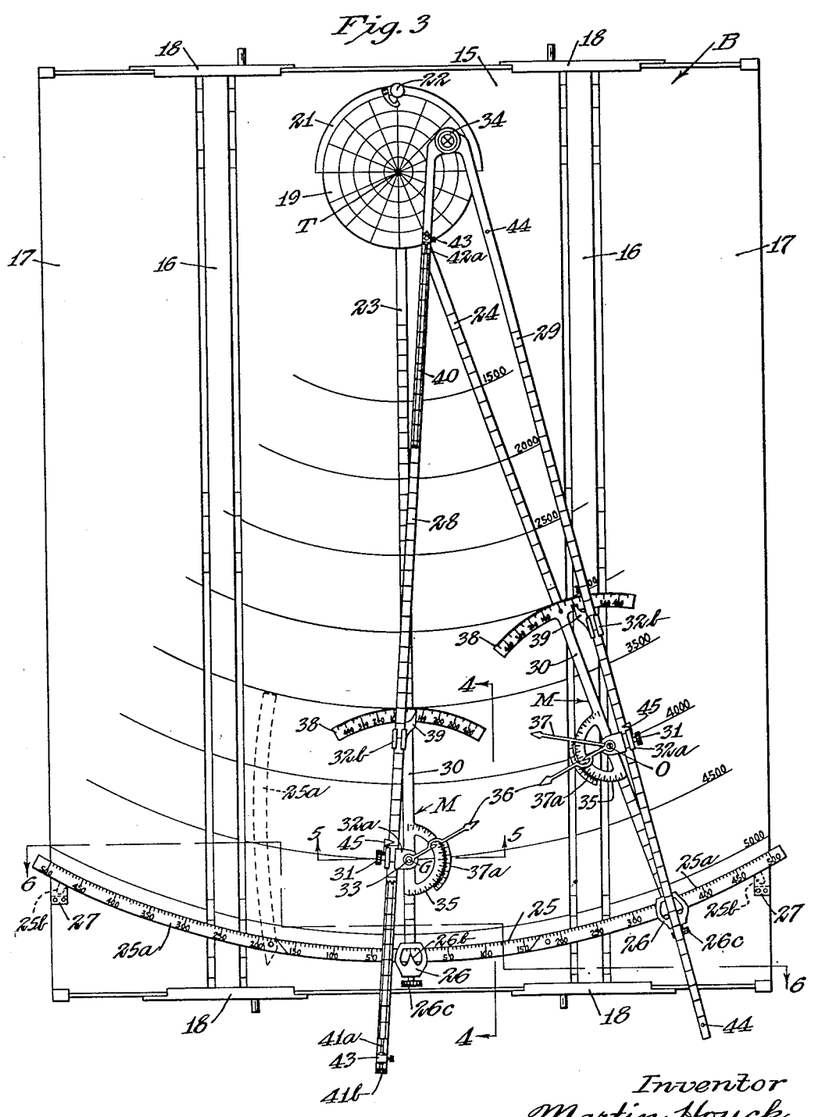
Fig. 3 is a plan view showing the entire apparatus after having been set up as shown in Fig. 2, and with the finder mechanism positioned with reference to the target area to correspond with the recorded or observed point at which the first shell fired struck.
Figure 4:
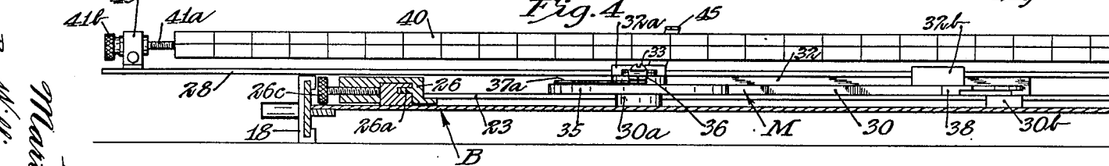
Fig. 4 is a vertical section taken on the line 4—4 of Fig. 3.
Figure 6:
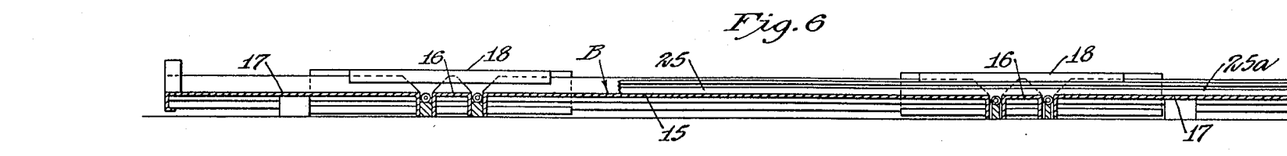
Fig. 6 is a cross section taken on the line 6—6 of Fig. 3 through the entire table when operatively set up.
Figure 13:
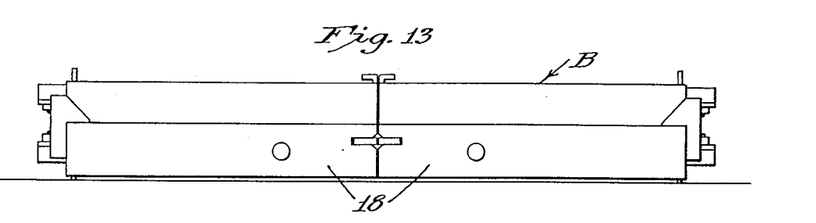
Fig. 13 is an end elevation of my apparatus collapsed into compact position.

In the form of my invention illustrated, I provide a flat support or table B conveniently constructed for folding into a compact, shallow box. As shown, this table comprises a central section 15, two narrow sections 16 hinged to the respective edges of the central section and constituting side edges of the box-like form when the device is folded. Other longitudinal sections 17 are hinged to the outer edges of the narrow sections 16 and constitue the top leaves of the box-like form. The several sections of the table are provided at their ends with flanges of uniform height to space the sections 17 from the central section when the table is folded and to so provide space for the several elements of the device supported upon the central section of the table. To maintain the several sections 15, 16 and 17 in a rigid plane position, I provide means in the form of slidable keeper elements 18 which slide upon the flanged end members of section 17 into a locking position, as shown in Fig. 13, when the device is compacted and which slide outwardly across the flanges of sections 16 and 17 when the device is disposed for use as shown in Figs. 3 and 6.

Figure 11:
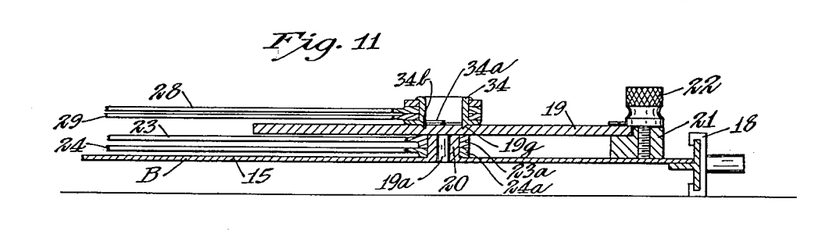
Fig. 11 is a vertical section taken on the line 11—11 of Fig. 1, showing the pivoting of the radial tracks and having the finder element centered on the target point.
Figure 12:
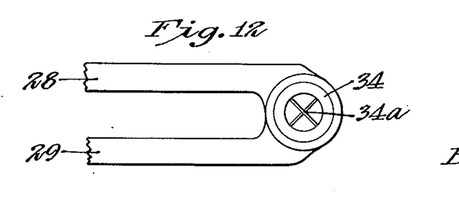
Fig. 12 is a detail plan view of the finder element of my finder mechanism.

Adjacent one end of the central table section 15 a target area element in the form of a circularly and radially graduated disc is mounted, the circular graduations corresponding to ten yard zones with the heavier circles representing one hundred yard zones and the radial graduations dividing the disc into sixteen segments, each representing four hundred mils. The disc 19 may be rotatably mounted, as shown in Fig. 11, by means of an axial pin 19a disposed in a bearing boss 20 fixed to section 15. The several radial graduations of the target area disc are numbered in multiples of four, as shown, from zero to 60, the zero graduation being disposed the same angular distance from the 60 graduation as the distance between any two of the radial graduations. A 180 degree segment 21 is fixed to the table embracing one-half of the marginal edge of the disc and having an annular shoulder over which the disc may ride when turned, and this segment 21 is preferably provided with a clamping screw 22 for holding the disc in predetermined positions.

My instrument includes as essential elements, a pair of independently adjustable radial tracks associated with the target area and corresponding respectively to the line from the gun to the actual target and to the line from the observation point to the actual target in any given problem. In the embodiment illustrated, the two radial tracks and associated mechanism are identical since in some problems one is used as the gun line track and the other as the observation line track, and in another problem the instrument is set up with the tracks used for opposite purposes.

In the accompanying drawings the radial track utilized for the gun line is indicated by the numeral 23, and the observation line track by the numeral 24, each independently pivoted for angular movement on the axis of the target point and extending from the target area to a large protractor sector 25 fixed to the central section of the table adjacent the end of that section opposite the target area disc 19. The two radial tracks 23 and 24 terminate at their forward ends in annular bearing rings 23a and 24a respectively, which surround and pivotally engage the upstanding bearing boss 20 upon which the target area disc 19 is mounted. The rear extremities of the radial tracks 23 and 24 are provided with slider clips 26 fixed thereto and having channels for receiving the large protractor sector 25, and further provided with guide tongues 26a which work in a complemental guide channel formed along the inner side edge of the sector 25. The clips 26 with the two radial tracks 23 and 24 attached thereto are thus slidable along the sector 25 and may be clamped in any desired predetermined position by means of a set screw 26c threaded through the outer end of each of said clips. The large protractor sector 25, as shown, is made up of three sections of similar cross sectional shape, the central section being rigidly fixed to the large central section 15 of the table and two end sector sections 25a being pivotally secured to the table section 15 for inward swinging movement to the dotted line position shown in Fig. 3 and for operative positioning in registration with and continuing the arcuate line of the central section of the sector, as shown in full lines on the drawings. When the end sections 25 are swung to operative position, small lugs 25b frictionally engage socket members 27 fixed at the appropriate points adjacent the outer edges of the outer section 17 of the table to retain the sector sections 25a in operative positions. The large sector 25 is preferably graduated into tens of mils (6400 mils to a complete circle in artillery), and the central reading of the sector is zero and the graduations may be numbered as shown in both directions from the zero reading to the 50, 100, 150, etc. Cooperatively associated with the graduations on the sector 25 are indicating elements or pointers 26b, one provided by each of the slider clips 26 and extending forwardly in the open central portion of the top of each of said clips to be brought into registration with the graduations on the sector 25.

A triangulated finder mechanism comprising a pair of elongated toggle arms 28 and 29 respectively, cooperates with the gun line and observation line tracks 23 and 24. The finder arms 28 and 29 are connected respectively with the gun line and observation line tracks 23 and 24 for shifting movement longitudinally of said tracks, as well as for angular or swinging movement relatively to said respective tracks, and to facilitate such connections and provide for necessary range adjustments in setting up my instrument for a given problem, connection means are provided as shown in the form of mountings generally designated as M, each longitudinally slidable for adjustment on its respective track.

Figure 5:
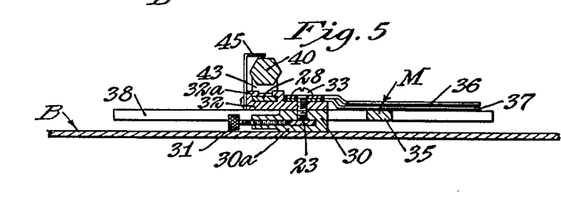
Fig. 5 is a cross section taken on the line 5—5 of Fig. 3.

The two mountings M are identical and in addition to supplying the recited connections between the finder arms and the respective tracks, carry a number of indicating elements which later will be described in detail. Each of the mountings M includes a bar 30 extending longitudinally of its respective track and having slide keepers 30a and 30b surrounding the track or slidable connection therewith, the keeper 30a being provided with clamping means in the form of a set screw 31, as clearly shown in Fig. 5. A finder arm connection bar 32 is pivotally secured to the bar 30 of each mounting by means of a pin or screw 33, and has affixed thereto a pair of spaced, aligned slides 32a and 32b for slidably receiving the free end of the related finder arm 28 or 29, as the case may be. With the above recited construction of connection mounting, it will be seen that each of the mountings M may be adjusted and positioned as desired, longitudinally of its associated radial track to correspond with the position of the observation point or gun, as the case may be in setting up the instrument for an existing problem. It will further be seen that with the slidable connections between the free ends of the finder arms 28 and 29 with the bars 32 of the mounting and the pivotal connection on the pivot pin 33 between bars 32 and the lower mounting bars 30 that the triangulated finder mechanism may be shifted laterally and longitudinally over any portions of the table and target area.

The finder mechanism includes an annular finder element 34 at the pivoted ends of the finder arms 28 and 29 which, as shown, constitutes the common pivot for said arms, the arms having super-imposed bearing eyes, as shown in Fig. 11, surrounding said finder element.

A cross hair 34a may be mounted at the bottom of the finder element 34, and to center the finder element with the target point, I prefer to provide means such as an annular flange 34b which may fit a corresponding annular groove 19g formed concentrically in the upper surface of the target area disc.

The axes of the pivot pins 33 of the two connection mountings M, with the device set up for a specific problem, represent the gun sight position and observation point of this specific problem and are respectively indicated on the drawings by the letters G and O. The two radial tracks 23 and 24 are preferably graduated to indicate the various ranges at which points G and O may be positioned from the target point T. The graduations on the tracks, as shown, are in tens of yards. For further convenience the table may be provided with concentric arcuate graduations which, as shown, represent 500 yards between table graduations. Each of the mountings M is provided with a gun range adjustment protractor 35, as shown, being integrally constructed or rigidly secured to the bar 30 of its associated mounting. The two protractor sectors are graduated in mils from zero in prolongation of the target to 3200 mils (one-half a circle) to facilitate the angular setting in each instance of an indicating pointer 36 with reference to the associated track. A second indicating pointer 37 is provided for each of the protractors, both pointers 36 and 37 being pivoted on the axis of the pivot pin 33 of the mounting. The indicator 37 preferably carries an arcuate scale 37a to facilitate angular setting with reference to its associated indicator 36. The arcuate scale 37a closely conforms to the exterior edge of the protractor 35, and is preferably graduated in mils from zero at indicator 37 outwardly. As will be later more clearly set forth, the gun range adjustment protractors 35 of the two mountings are set and adjusted cooperatively to determine the positioning of the gun point G on the gun track 23 from the range of the observation point determined through the usual range finder and from the TOG angle determined by the battery commander's telescope, and with a sight taken on a stake or other object spaced ahead of the gun position.

Deviation protractors 38 are provided, one for each of the mountings M, for association with the track and finder arm connected with the particular mounting. As shown, on each mounting the deflection protractor 38 is fixed to the end of the mounting bar 32 nearest the target and is graduated in mils for cooperation with a short indicator or pointer 39 fixed to the guide or slide 32b which forms a part of the finder arm receiving bar 32. Variance in angulation between one of the finder arms and its connected track may thus be read in mils from the protractor 38 on the associated mounting bracket.

Figure 7:
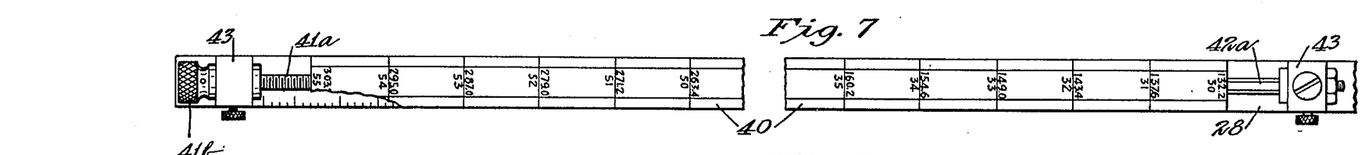
Fig. 7 is a detail plan view on a somewhat larger scale showing one of the selective ammunition range scales.
Figure 8:
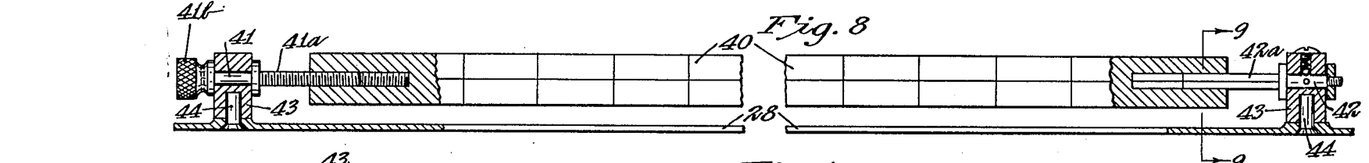
Fig. 8 is a side elevation, with some portions broken away, of the ammunition scale shown in Fig. 7.
Figure 9:
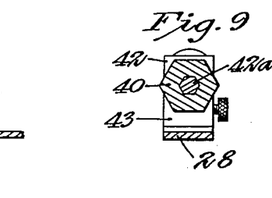
Fig. 9 is a detail cross section taken on the line 9—9 of Fig. 8.
Figure 10:
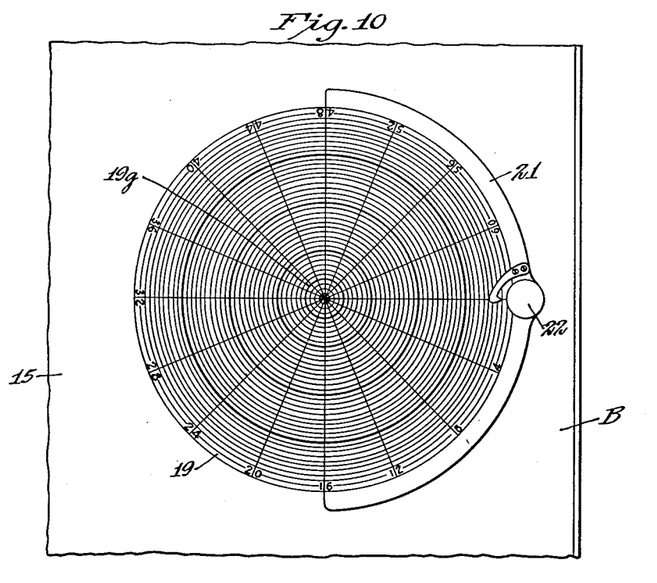
Fig. 10 is a plan view of a suitable form of target area element.

An ammunition range scale 40 adapted for connection with either one of the finder arms 28 and 29 is provided in the form of a rotatably mounted, elongated body of polygonal shaped cross section, selectively shiftable to position any one of its flatted surfaces uppermost in accordance with the scale desired for a certain type of ammunition. The scale 40 is provided with trunnions 41 and 42 (see Figs. 7 to 9 inclusive) which are journaled in suitable bearings provided by a pair of upstanding lugs 43 which are socketed at their lower ends to detachably engage upstanding studs 44 carried by each of the finder arms 28 and 29. Obviously by removing the two lugs 43 of the ammunition scale from the studs 44 of one of the finder arms, the scale may be quickly mounted upon the corresponding studs 44 of the other finder arm. An overhanging indicator 45 fixed to the guide arm 32 of the finder arm receiving bar cooperates with the graduations on the ammunition scale, as will be later more clearly set forth.

The ammunition scale 40 is mounted for slight longitudinal adjustment of a micrometer nature to provide for angle of sight variation. To this end the inward extension or stub shaft 42a carried by the trunnion 42 slidably engages a relatively elongated socket in one end of the ammunition scale 40, while at the other end of the scale 40 a screw 41a extending from the trunnion 41 threadedly engages an elongated threaded socket at that end of the scale 40. The trunnion 41 is provided with a knurled knob 41b by which the screw may be turned to longitudinally shift to a slight extent the position on the scale 40. The finder arm at one of its edges below the scale 40, may be graduated into increments of five mils with a zero reading at the central position of scale 40 within its supporting brackets and the outer end of scale 40 acts as an indicator to cooperate with this scale in determining the setting thereof.

One convenient method of accurately and quickly setting the gun position point G on my instrument for correct range, as will later be disclosed in detail, depends upon the proper calibration on one of the bars of the gun line mounting of a measurement corresponding to some predetermined yardage. Thus, as shown, I have constructed the finder arm receiving bar 32 of each of the adjustable mountings M in such manner that the distance between the end of indicator 39 and the gun point G is calibrated for 1000 yards.

Operation

Figure 1:
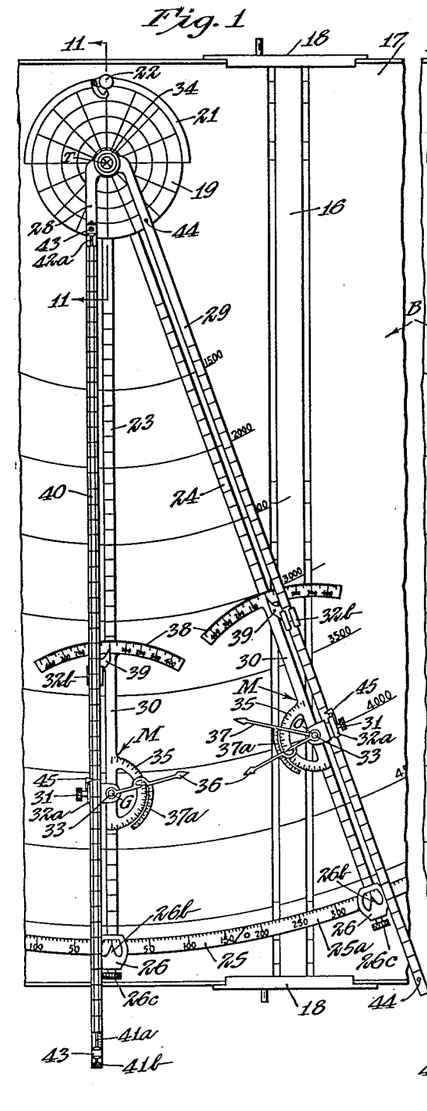
Fig. 1 is a plan view of an embodiment of my instrument with portions of the table broken away and showing the observation point element and the range adjustment protractor also in proper adjusted position before the gun position element and angulation of the gun line and observation line tracks are set.

Assuming that actual conditions present a lateral problem with the observation position at the right of the guns, the battery commander first determines the range from the observation point to the target from the conventional range finder or in any of the other approved methods. Let us assume this to be 4000 yards. In setting up my instrument for the problem, the gun line track 23 is set at some arbitrary point on the large protractor sector 29, preferably at the zero point. The observation line track may then be set at any estimated angulation with reference to the gun line track and the observation point element O is set at the ascertained range 4000 yards by slidably adjusting the observation line mounting M on track 24, in conformance with the graduated range scale, all as shown in Fig. 1.

Figure 2:
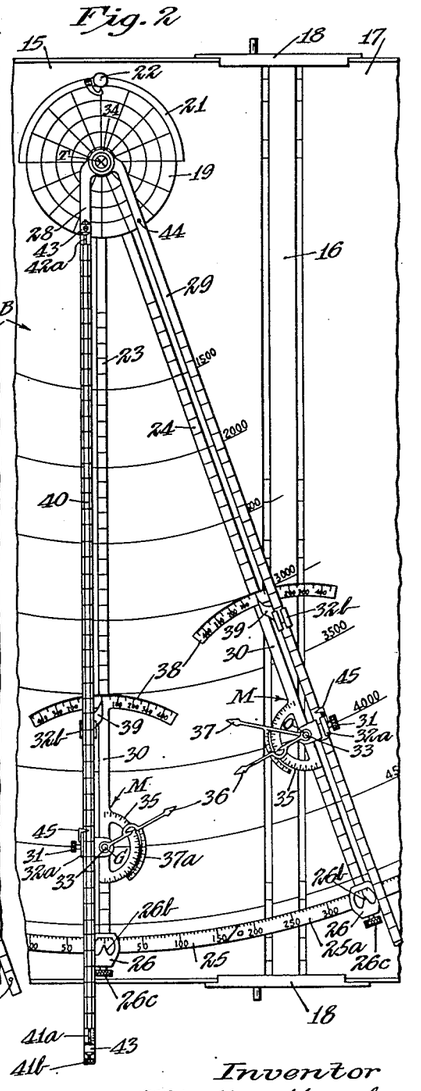
Fig. 2 is a similar view with the instrument set up for a given problem.

The TOG angle is then determined by sighting the actual target and the gun position through the battery commander's telescope, and the indicator 36 on the observation line mounting is then adjusted on the protractor 35 to correspond with this ascertained TOG angle. A sight is taken with the BC telescope from the actual observation point, on an aiming stake positioned some predetermined distance, say twenty yards, ahead of the gun position and a second sight is taken on the gun position, and the angle between these two lines of sight is thus measured, giving the angle from the actual observation point between two points on a known base, to wit; twenty yards. This relatively small angle is then multiplied by the proper factor (here 50) to obtain the angle for a thousand yards which is the calibrated base line set out on the bar 32 which is pivotally connected with the mounting for the gun line track and which slidably receives the finder arm 28. The second indicating pointer 37 on the gun range adjustment protractor 35 of the observation line mounting is then set at the computed multiplied angle with reference to the setting of the first indicator 36 previously set for the TOG angle. This is quickly accomplished by means of the arcuate scale 37a. The observation line track is then swingably shifted circumferentially of the large protractor sector 25 and at the same time the mounting M for the gun position is shifted longitudinally by sliding on the gun line track until the two indicators 36 and 37 on the observation range adjustment protractor point precisely and respectively to the gun point G of the opposite mounting and the end of indicator 39 of such mounting. Fig. 2 shows my instrument correctly set up and adjusted in accurate conformance to the problem with the point O set at 4000 yards range, with the indicating arrows 36 and 37 of the observation mounting set in conformance to the TOG angle and the line of sight from the observation point to the thousand yard base line calibrated on the gun line mounting respectively, and with the gun line mounting properly positioned on its track and the angular relation of tracks 23 and 24 accurately conforming to the problem. Both of the indicating arrows or pointers 36 and 37 on the gun line mounting should then be set in alignment with arrow 36 of the observation mounting to enable the angle TGO to be read from the gun mounting protractor 35. It will be noted that there is only one position of the gun line mounting and point G with reference to track 23 and only one angulated position of track 24 with reference to track 23 at which the indicating arrows 36 and 37 will point perfectly upon point G and the associated indicator 39.

The triangulated finder mechanism is then positioned with the finder element 34 centered on the target point T, as shown in Fig. 3, the correct face of the ammunition range scale having been disposed upwardly according to the type of ammunition desired for this specific problem and the approximately correct reading for elevation or range may then be taken from the position of the indicator 45 with reference to the upper face of scale 40. In this centered position of the finder mechanism there will, of course, be no deflection indicated on the deflection protractor 38 of the gun line mounting, nor will there be any deviation indicated on the deflection protractor 38 of the observation line mounting, both indicating elements 39 pointing at zero when said finder mechanism is centered.

The angle measured by the indicator 36 on the gun line mounting gives the deflection to "lay" the gun on the target. The battery commander then directs the gunner to aim on the observation point and then gives the deflection reading from the indicator 36 of the gun line mounting of the instrument, and when the deflection is made by the gunner and the gun sight again is trained on the observation point, the gun is positioned on the target. The reading for range or equivalent elevation of the gun is taken from the scale 40 and transmitted by phone to the gunner, whereafter the gun is fired. Sensing is then obtained for the first shot. If this sensing is obtained through an airplane, the sensing is given in yards over or short of the target, and in yards to the left or right of the target. The battery commander after such a sensing, merely takes the finder mechanism and sets the finder element 34 over the corresponding point on the target area, which produces a deflection reading on the deflection protractor of the gun line mounting. This reading gives the correction for deflection or shift of the gun which would cause the next shell fired to strike the target provided no correction for range was necessary. A correction for range is next in the problem as the first shell went over the target as sensed, and therefore the finder is moved from the position shown in Fig. 3 to position the finder element 34 on the transverse line of the target area disc passing through the target point. When the finder mechanism is so positioned, the approximately correct reading for corrected range or elevation may be read from the range scale 40 associated with the gun line bracket. The deflection expressed in mils obtained from the first reading, with the finder mechanism positioned as shown in Fig. 3, and the corrected range or elevation is then given to the gunner by telephone and the gunner fires the second shot after making such corrections. The second shot fired with adjustment of the gun after such corrections, should come very close to the target and upon a sensing of the second shell the finder element is again positioned at the point on the target area of my instrument corresponding to the point where the shell struck, and slight corrections, if necessary, are obtained on the instrument from the readings in the manner above related, and the proper corrections given to the gunner. This procedure is continued until the target is hit. With my instrument it is usually possible to hit the target after from three to six shots are fired.

Assuming the same problem without the availability of airplane sensings and wire, as is often the case, the shot must be sensed with a battery commander's telescope. The procedure in utilizing my instrument is slightly different from that in the case first described. The battery commander takes a telescope sensing upon the firing of the first shell and estimates a certain angle of deviation from the observation line, and usually is uncertain as to whether the shell is over or under the target. To determine the corrected deflection the finder mechanism is shifted laterally to a position where the finder element 34 is approximately on the transverse line X—X passing through the target point and where the reading on the deflection or deviation protractor 38 of the observation line mounting is in accordance with the angle of deviation sensed. With the finder mechanism so positioned, the reading of the indicator 39 on the protractor 38 of the gun line mounting gives the corrected deflection for the gunner to bring the gun on the line. The second shot is then fired at the same range and the battery commander again obtains a telescopic sensing. If the second shot is over the target, but on the line, the triangulated finder is shifted to bring the finder element 34 on the point of the target area disc corresponding to the sensed point where the shell struck. A slight corrected reading for deflection is then read off of the deflection protractor 38 on the gun line bracket. It then is necessary to obtain the corrected range, and to this end the finder element 34 is usually positioned on the line of sight of the instrument just a trifle short of the target point T. The corrected range may then be read off of the range scale 40 and the gunner may be corrected for the obtained deflection and corrected range or elevation. This procedure is repeated until the target is struck.

My instrument is equally adaptable for use in changing fire to a new target. Where this is desired I prefer to equip each of the finder arms 28 and 29 with a range scale, as clearly shown in Fig. 3 only. Graduations for such range scales may be made on the top of the finder arms and have no reference to the ammunition range scale 40 previously described. This enables a new target to be sighted from the observation point and the angle between the former line of sight and the new line of sight to be measured by the BC telescope and the finder so positioned for such angle. The range from the observation point to the new target may then be determined with a range finder, and the finder mechanism adjusted on the new line of sight until the range scale on the finder arm 29 is properly positioned with respect to its indicator for the range of the new target. The approximate deflection correction and range correction for the gun may then be taken off the deflection protractor 38 and ammunition range scale 40 of the gun line mounting. A shot may be fired with the gun so corrected. The procedure in utilizing the instrument on subsequent shots to strike the target would be essentially the same as described.

My instrument is also excellently adapted for directing and controlling axial fire, in which instance the track 23 and finder arm 28 only are utilized, and the track 24 and finder arm 29 may be disregarded since the observation point is disposed almost directly behind the gun position. The range from the observation point to the target is, of course, first determined by a range finder, and then the gun line bracket is properly positioned on track 23 for the estimated range of the gun which can be closely estimated in axial fire. With the finder element 34 disposed on the target point of the disc 19, the adjusted range or elevation is read off the ammunition range scale 40, and with the gun so adjusted the first shot is taken. A sensing is made and the correction for deflection is read directly off the deflection protractor 38 on the gun line bracket. The gun is then adjusted to bring it back upon the line and a second shot is taken. Assuming the second shot is slightly over the target, the finder element 34 is moved slightly forward on the target point of the disc 19 and a corrected reading for range is taken off the scale 40 and a third shot fired which should hit or come very closely to the target. This procedure is continued until the target is struck.

From the foregoing description it will be seen that due to the relationship of my triangulated finder mechanism with the radial tracks positionable without mathematical calculations and use of tables to represent the actual observation line and gun line positions. The angulation between the finder arms and tracks with the finder element properly disposed after a sensing will immediately show the correction for deflection and the corrected range will be given in each instance when the finder element is positioned to the desirable position for the next shot. Various types of cooperating scales, protractors and indicators may be associated with the tracks and finder arms, that in every instance the angular position of the finder arms relatively to the tracks and the slidably adjusted position of the arms relatively to the connection brackets indicating the corrections.

If it is desired, the graduations on the selective ammunition range scale 40 may be reversed in progression reading in larger numbers when the finder arm 28 is lengthened in its relation to the indicator 45. If scale 40 is so constructed, a corrected range may be read directly off scale 40 at the same time the correction for deflection is read; that is, when the finder element 34, after a shell is fired, is positioned at the point on the target area corresponding to the point where the said shell struck.

Means other than the gun range and adjustment protractors 35 and the associated indicators 36 and 37 may be provided for locating the gun position G of gun line mounting M and the TOG angle, which other means, however, in most instances would require either a mathematical calculation to determine the distance between the observation point and the target, or would require pacing off the distance. These, however, are all contemplated.

It will be seen that with my instrument all mathematical calculations by method of trigonometry and the use of tables for obtaining elevations, ranges, deflections of guns are eliminated, nor is it necessary to compute factors of drift, deviation, windage or atmospheric condition. Corrections of the moment with the use of my device are substantially accurate as contrasted with inaccuracies in the methods now utilized.

Not only, therefore, is the direction and control of gun fire tremendously simplified by the use of my improved apparatus, but extremely accurate results can be obtained and a target may usually be hit after three or four shells are fired.

It will, of course, be understood that various changes may be made in the form, details, arrangement and proportions of the various parts without departing from the scope of my invention.

What is claimed is:

1. In an instrument for plotting the positions and computing basic data and corrections in gun fire, a target area element having a target point, a pair of tracks independently pivoted at their inner ends co-axially with the target point of said area element and extending radially therefrom, one of said tracks representing the line from the gun position to the target point and the other of said tracks representing the line from the observation post to the target point, and a triangulated finder having a finder element which may be associated with said target area element and having a pair of arms pivoted together at their inner ends on the axis of said finder element, said arms each being connected with one of said tracks for shifting movement longitudinally of said track and also for angular adjustment relatively to said track to position said finder element at innumerable points on said target area corresponding to the positions at which fired shells strike, whereby the angular relation between said finder arms and tracks when said finder element is so positioned will determine gun corrections for deflection.

2. In an instrument for plotting the positions and computing basic data and corrections in gun fire, a target area element having a target point, a track representing the line from the actual gun position to the actual target, said track extending radially from the target point of said instrument, a finder mechanism having an arm connected with said track for shifting movement longitudinally thereof and also for angular adjustment relatively to said track, said finder having an element adapted to be positioned at innumerable points over said target area to correspond to the positions at which fired shells actually strike, the angular relation between said finder arm and said track when said finder element is so positioned determining gun corrections for deflection and the difference in longitudinal positions of said finder arm and track determining corrections for range or elevation.

3. In an instrument for plotting the positions and computing basic data and corrections in gun fire, a target area element having a target point, a pair of tracks independently pivoted at their inner ends co-axially with the target point of said area element and extending radially therefrom, one of said tracks representing the line from the gun position to the target point and the other of said tracks representing the line from the observation post to the target point, and a triangulated finder having a finder element which may be associated with said target area element and having a pair of arms pivoted together at their inner ends on the axis of said finder element, said arms each being connected with one of said tracks for shifting movement longitudinally of said track and also for angular adjustment relatively to said track, said triangulated finder being free for movement across said target area element and cooperating indicating elements associated with said tracks and said legs whereby with said tracks set up in conformance to the actual angle between the observation point, target and gun and with the connections of said legs with said tracks corresponding to the actual positions of the observation point and gun respectively on the observation point and gun lines to said target, then when said finder element is moved to the position on said target area element where a shot has struck, the readings for correcting the deflection and also elevation of the gun may be read off of the cooperating indicating means associated with the gun line track and connecting finder arm.

4. In an instrument for plotting the positions and computing basic data and corrections in gun fire, a target area element having a target point, a pair of tracks independently pivoted at their inner ends co-axially with the target point of said area element and extending radially therefrom, one of said tracks representing the line from the gun position to the target point and the other of said tracks representing the line from the observation post to the target point, and a triangulated finder having a finder element which may be associated with said target area element and having a pair of arms pivoted together at their inner ends on the axis of said finder element, said arms being connected with one of said tracks for shifting movement longitudinally of said track and also for angular adjustment relatively to said track, said triangulated finder being free for movement across said target area element, graduations on said tracks for setting said connections with the associated finder legs for predetermined ranges, whereby the connection for the finder leg of the observation post line track may be first correctly positioned, means for positioning an angularly adjustable element in a predetermined position with reference to the observation point line of said track, and cooperating indicating elements associated with said last mentioned means by which the correct angular relation between said gun and observation tracks may be determined and the correct position of the connection between said gun track and the associated finder leg determined and positioned and other cooperating indicating means associated with said finder arms and their respective connected tracks for computing corrections in range and deflection for properly resetting the actual gun after the finder element has been positioned to correspond on the target area with the actual point where a fired shell has struck.

5. In an instrument for plotting the positions and computing basic data and corrections in gun fire, a target area element having a target point, a pair of tracks independently pivoted at their inner ends co-axially with the target point of said area element and extending radially therefrom, one of said tracks representing the line from the gun position to the target point and the other of said tracks representing the line from the observation post to the target point, and a triangulated finder having a finder element which may be associated with said target area element and having a pair of arms pivoted together at their inner ends on the axis of said finder element, said arms each being connected with one of said tracks for shifting movement longitudinally of said track and also for angular adjustment relatively to said track, said triangulated finder being free for movement across said target area element, a scale on at least one of said tracks for setting its associated connection means with its associated finder leg for predetermined ranges, whereby the connection for the finder leg of the observation post line track may be first correctly positioned, a protractor associated with each of said tracks and its related finder leg to measure the angular relation between said respective elements and a range or elevation scale on the finder arm associated with the track utilized as the gun line track adapted to indicate the correct range and elevation for actually positioning the gun after the two tracks have been related accurately for the problem and the connection for the gun line mounting has been properly positioned on its associated track to correspond with the actual position of the gun in the problem and after the finder element has been properly positioned to determine corrections.

6. In an instrument for plotting the positions and computing basic data and corrections in gun fire, a target area element having a target point, a pair of tracks independently pivoted at their inner ends co-axially with the target point of said area element and extending radially therefrom, one of said tracks representing the line from the gun position to the target point and the other of said tracks representing the line from the observation post to the target point, and a triangulated finder having a finder element which may be associated with said target area element and having a pair of arms pivoted together at their inner ends on the axis of said finder element, said arms each being connected with one of said tracks for shifting movement longitudinally of said track and also for angular adjustment relatively to said track to position said finder element at innumerable points on said target area corresponding to the positions at which fired shells strike, cooperating indicating means associated with said gun line track and its associated finder arm for indicating the longitudinal shifting movement between the connection of said last mentioned finder arm and its associated track, said cooperating indicating means including a range or elevation scale and an indicating element cooperating therewith.

7. The structure set forth in claim 6, and said range or elevation scale being graduated to indicate range corrections for certain types of ammunition and means for detachably connecting said scale with either of said finder arms, whereby either track and its associated finder arm may be utilized in the instrument to represent the gun line position.

8. The structure set forth in claim 6, and said scale having a multiplicity of elongated, differently graduated surfaces and mounted for selective positioning of any one of said surfaces for cooperation with said indicator, said several surfaces carrying different graduations, each designed for corrections in elevation and range for a different type of ammunition.

9. In an instrument for plotting the positions and computing basic data and corrections in gun fire, a target area element having a target point, a pair of tracks independently pivoted at their inner ends co-axially with the target point of said area element and extending radially therefrom, one of said tracks representing the line from the gun position to the target point and the other of said tracks representing the line from the observation post to the target point, and a triangulated finder having a finder element which may be associated with said target area element and having a pair of arms pivoted together at their inner ends on the axis of said finder element, said arms each being connected with one of said tracks for shifting movement longitudinally of said track and also for angular adjustment relatively to said track, said triangulated finder being free for movement across said target area element, a protractor indicator associated with the gun line track and its related finder arm and having cooperating indicating elements for showing the angular relation between said gun line track and its related finder arm when the finder element has been positioned to correspond with substantially the position where a shell has struck.

10. In an instrument for plotting the positions and computing basic data and corrections in gun fire, a target area element having a target point, a pair of tracks independently pivoted at their inner ends co-axially with the target point of said area element and extending radially therefrom, one of said tracks representing the line from the gun position to the target point and the other of said tracks representing the line from the observation post to the target point, and a triangulated finder having a finder element which may be associated with said target area element and having a pair of arms pivoted together at their inner ends on the axis of said finder element, said arms each being connected with one of said tracks for shifting movement longitudinally of said track and also for angular adjustment relatively to said track to position said finder element at innumerable points on said target area corresponding to the positions at which fired shells strike, a protractor comprising a protractor scale and a pair of indicators associated with the observation line track and adapted to be set at predetermined angles corresponding to the angle between two sighted points of known distance apart on the actual gun line and by which the positioning of the gun point mounting on its associated gun line track may be set, as well as an angle between the gun line track and observation line track on the instrument; and cooperating indicating means associated with said gun line mounting for showing the range or elevation from the gun to the target on the instrument.

MARTIN HOUCK.